United States Patent
Schneider

[15] 3,662,801
[45] May 16, 1972

[54] COMPOSITION CAUSING COMBUSTION WHEN CONTACTED WITH WATER

[72] Inventor: Karl Schneider, Basel, Switzerland
[73] Assignee: Scheidemandel-Motard-Werke AG, Berlin-Spandau, Germany
[22] Filed: May 15, 1969
[21] Appl. No.: 825,059

[30] Foreign Application Priority Data

May 24, 1968 Switzerland ........................ 7573/68

[52] U.S. Cl. .................................. 149/5, 149/37, 149/43, 149/44, 149/87, 252/188.3
[51] Int. Cl. .................................................. C06b 19/02
[58] Field of Search ............................ 149/5, 37, 43, 44, 187; 252/188.3

[56] References Cited

UNITED STATES PATENTS

| R25,277 | 10/1862 | Toulmin ........................ 149/37 X |
| 2,995,526 | 8/1961 | De Ment ........................ 149/81 X |
| 3,009,800 | 11/1961 | Swimmer ........................ 149/22 X |

*Primary Examiner*—Carl D. Quarforth
*Assistant Examiner*—Stephen J. Lechert, Jr.
*Attorney*—Browdy and Neimark

[57] ABSTRACT

A material for causing combustion which includes a carbide capable of reacting with water to form an inflammable gas, an igniter in the form of a metal such as sodium and, optionally, an amide or peroxide of an alkali metal or an alkaline earth metal, and/or other compounds evolving oxygen.

16 Claims, No Drawings

COMPOSITION CAUSING COMBUSTION WHEN CONTACTED WITH WATER

The present invention relates to materials for causing combustion, to methods for producing them and to the applications of such materials for the destruction by burning of layers of oil and oil residues.

More particularly the invention is concerned with such materials for causing combustion that react on contact with water to form an inflammable gas and an igniter which ignites this inflammable gas. The word water is meant to include moisture quite generally, for instance also in forms such as fog or mist, dew, aerosols or clouds of moist material, snow and ice.

In accordance with a prior art proposal, widespread fires were to be produced on water surfaces by using flame throwers, or incendiary projectiles to set the oil or oil residues on the water surface aflame. Additionally it was possible to use readily inflammable mineral oil, or other inflammable liquids not capable of mixing with water, on the surface of the water where the oil was to be burned. These methods, however, suffered from the disadvantage that ignition could seldom be depended upon with any certainty and a simultaneous ignition over a large surface was an expensive operation which was difficult and could not be applied in all cases. Furthermore, it was usually difficult to maintain combustion sufficiently to remove the substances which were to be destroyed by combustion.

One object of the present invention is to provide a fire producing substance which is free of these disadvantages.

The present invention relates to a substance for producing fires comprising a gas former in the form of a carbide, such as calcium or aluminum carbide, which is capable of reacting with water to form an inflammable gas; an igniter in the form of a light metal of the First Group of the Periodic System, such as sodium or potassium, or barium, strontium, calcium, or a hydride or oxide of such a metal; and, optionally, an amide or peroxide of an alklai metal or of an alkaline earth metal and/or further compounds producing oxygen to act as sources of oxygen.

The method for the production of such a substance for producing fires can be carried out by intimately mixing a carbide, such as calcium or aluminum carbide, capable of reacting with water to form an inflammable gas, with a light metal of the first group of the Periodic System, such as sodium or potassium, or barium, strontium, calcium or a hydride or oxide of such a metal in a finely dispersed form, with or without the addition of amides or peroxides of an alkali metal or alkaline earth metal. It is also possible to add inflammable hydrocarbons and/or further compounds which release oxygen. The mixture can be granulated or solidified in the form of a gel.

In order to improve the action of the material it is possible to add aluminum powder especially in the case of materials acting as sources of oxygen in the material.

Owing to the extremely high reactivity of the material for producing fires in accordance with the invention on contact with water, the material is particularly suitable for producing fires covering large areas, for example for destroying oil by fire on water surfaces and on sea shores, for example after accidents involving oil tankers.

The component which forms an inflammable gas on contact with water is preferably ground calcium carbide which forms with water a highly inflammable acetylene gas which has a high specific heat of combustion.

Aluminum carbide, which occurs as a waste product in the operation of aluminum smelting furnaces and which generates methane on contact with water, is also suitable. Magnesium carbide, which involves methyl acetylene or propyne, is less preferred owing to the costs involved.

The inflammable gases, which spread out in all directions owing to expansion pressure, are caused to ignite by the igniters which simultaneously also react with the water, preferably spontaneously, and ignite themselves, for example with the formation of hydrogen gas.

As igniter, the material for causing combustion in accordance with the invention can contain a metal of the First or Second Group of the Periodic System which reacts with water with the formation of a large amount of heat or with combustion. It is also possible to use as an igniter an oxide or hydride of such a metal. Of these alkali and alkaline earth metals, metallic sodium forms a preferred igniter which spontaneously reacts with water. Such sodium can be applied directly in a finely divided form on the carbide or can be mixed with the ground carbide on a suitable carrying substance.

In order to apply the metal to the carbide particles so as to achieve the largest possible active surface area, the carbide and the metal, that is to say preferably sodium, can be ground in a ball mill to a suitable particle size, or the carbide, after it has been ground to a suitable particle size, can be mixed with a dispersion of the metal, preferably sodium, in hydrocarbons, the surface of the metal particles suspended in this dispersing medium being increased about a 1,000 times so that the reactivity is correspondingly increased and, furthermore, combustion is encouraged by the hydrocarbon or hydrocarbons present.

Such igniters are substances which react with water extremely exothermically, usually with spontaneous combustion, so that the gas released by the carbide is ignited. Besides the metals sodium, potassium, barium and calcium mentioned as being particularly suitable, it is also possible to use their alloys with each or with heavy metals such as a sodium-lead alloy containing about 30 percent sodium. Of the hydrides, calcium and magnesium hydrides are more particularly suitable. They react with water very vigorously. Potassium hydride, which spontaneously ignites in air, can be passivated somewhat for use in making up material in accordance with the invention for causing combustion. This is also the case with other substances which may be excessively reactive, such as sodium-potassium alloys. The material for causing combustion can also contain a mixture of oxides or hydrides. Furthermore, the oxides or hydrides of the alkali or alkaline earth metals in the igniter can be partially replaced by amides or peroxides of these metals.

In order to facilitate transport and to improve application, the substance for causing combustion can be granulated with the use, if desired, of readily inflammable binding agents. In accordance with a further development of the invention which may prove advantageous for certain applications, the binding agent can be hydrophobic. It is only necessary to add a very small quantity of the fire producing substance, which may or may not be hydrophobic, in order to ignite the whole charge which is to be burnt, since the heat involved on ignition readily causes the highly inflammable binding agent to be burnt off so that further material for causing combustion is exposed to the action of water. This rendering of the material hydrophobic or water-repellant, which is carried out to a greater or lesser extent, can also be used for the passivation of particularly reactive igniter materials, such as potassium hydride. For technical reasons connection with production and application, it is preferable to use a liquid hydrocarbon as a binding agent which repels water, the water repellancy being set as desired by selecting the viscosity and/or the surface tension of the hydrocarbon. The viscosity or surface tension varies the layer thickness on the material for causing combustion by a component of it and/or the speed with which such a passivating hydrocarbon flows from the material for causing combustion under the action of gravity, evaporation, or washing away by water.

The granulated form of material produced of metal and carbide can be used directly for causing combustion. Particular cases of application include use as a means for causing ignition and as a means for destroying by combustion oil released after accidents to tankers. It is, however, also possible to disperse the granulated material in a gel, which has a high or low degree of viscosity, made up, for example, of highly dispersed dioxides or metal soaps with or without synthetic resins in hydrocarbons. Such a composition burns for a longer time.

In order to intensify the combustion and increase the temperature of combustion, oxidants can be mixed with the material for causing combustion. Such oxidants include all compounds which readily evolve oxygen, more particularly the oxides, peroxides and nitrates of alkali metals, alkaline earth metals and heavy metals, and also conventional oxidants such as $KMnO_4$ or chlorates. The substances for causing combustion, with the activating additions described in the examples below, can also be made sensitive to impact. Since, however, the ignition can take on the character of an explosion, they are also suitable for use on rocky coasts which are not readily accessible. In this case the materials can be dropped from an aircraft and are sprayed on ignition for a considerable distance so that a large area can be treated. This is especially significant if oil residues have been exposed to the action of sea water for a long period of time, are difficult to ignite, and do not form a continuous surface layer. $NaNo_3/KNO_3/MnO_2$ mixtures in combination with $CaC_2$ and Na are ignited by water but can also be detonated by impact. When used with pyrogenic aluminum powder a particularly effective action is obtained suitable for treating the surfaces of.

Whether the material for causing combustion is to be made in a granulated form or as a gel depends primarily on the purpose for which it is to be used, so that the greatest possible degree of efficacy can be reached. A granulated form of material can contain, besides light metals of the First and Second Groups of the Periodic System, a carbide and the above-mentioned compounds such as oxidants, also additives in the form of petroleum fractions or derivatives which favor or activate combustion.

A gel produced from highly dispersed silica or metal soaps, such as sodium palmitate, in hydrocarbon and, for example, polystyrene, can be made into an incendiary jelly-like mass by dispersing the igniter part of the metal carbide in granulated form or the directly produced finely dispersed mixture, preferably the sodium carbide in granulated form, in the gel, so that due to a modification of the hydrocarbon part a gel is produced. The viscosity of the gel can be varied between a low and a high value by suitable choice of the hydrocarbons and their quantities.

The following examples serve to explain the invention.

EXAMPLE 1

Sodium metal in an inert dispersing medium, preferably test petrol or light lubricating mineral oil, was treated in a dispersing apparatus, provided with heating means and operating on the rotary impeller principle, in a nitrogen atmosphere so as to form a hydrocarbon-sodium dispersion. To produce a 33 percent suspension, 80kg of dispersant and 40 kg of sodium metal were required. The sodium was added in increments and to improve homogenization, about 0.25 percent oleic acid was added. Since the melting point of sodium is 97.8° C, the melting point of the dispersant must be above this temperature. By very fine division in the dispersion sodium particles were obtained of a size of 2 to 24 microns, corresponding to about a 1,000 fold increase in the metal surface so that there was an increase in the reactivity of the material. To 20 parts by weight of this dispersion, 80 parts by weight of ground calcium carbide were added simultaneously and the mixing was carried out until an even mixture was produced so that the metal particles suspended in the dispersion were applied to the carbide. The mixture removed from the mixing apparatus was in the form of a fine granulated material which could be used directly.

EXAMPLE 2

A granulated material according to Example 1 was produced by grinding together carbide and sodium in a ball mill so as to cause the sodium to be applied to the carbide; this also being carried out in a nitrogen atmosphere. The same quantities of sodium and calcium carbide were used as in Example 1. The ground product was in the form of very fine particles and could, if desired, be granulated in a conventional manner while excluding moisture as far as possible.

EXAMPLE 3

For producing an incendiary jelly-like mass 65 parts by weight of a hydrocarbon mixture (1:1 by volume petrol and heating oil mixture), 5 parts of finely dispersed silicon dioxide, 5 parts of crystalline polystyrene, 20 parts of calcium carbide with a particle size of 0.2 to 2 mm and 5 parts of finely granulated sodium metal were mixed together. As thixotropic agent, bentonite, kieselguhr, hectorite and the like can be used as well as the silicon dioxide.

For carrying out the process the first step was the production of a basic gel with the hydrocarbon mixture of petrol and heating oil (with the volumetric ratio of 1:1) being dispersed in a stirring apparatus with about 5 percent by weight of the silicon dioxide with a particle size of about 15 millimicrons until a gel of the desired consistency was produced.

The consistency of the gel was set in various test runs as follows:

In the case of 4 percent silicon dioxide addition a low viscosity was attained.

In the case of 5 percent silicon dioxide addition a medium viscosity was attained.

In the case of 6 percent silicon dioxide addition a high viscosity was attained.

In the case of 7 percent silicon dioxide addition a pasty viscosity was attained.

For stabilizing the consistency and increasing adhesion, 5 percent by weight of crystalline polystyrene were added which partially swelled in the hydrocarbon dispersion and partly dissolved. A complete solution of the synthetic resin is to be avoided as otherwise the solid particles could become encapsulated and thus become completely hydrophobic.

As a gas forming substance 20 parts by weight of calcium carbide, particle size 0.2 to 2 mm were mixed in with the basic gel, while as an igniter, 5 parts by weight of sodium metal were added in a finely divided granulated state. This mixture containing 0.2 to 2 mm calcium carbide and finely divided sodium metal in a weight ratio of 4:1 is referred to below as "P" type substance.

The substance represented an incendiary helly with a long burning time and good igniting properties.

In the case of a further run calcined and air sieved kieselguhr were added in an amount equal to about 10 percent, together with sodium nitrate as an oxygen carrying substance, also in an amount equal to about 10 percent. It is to be noted that the addition of sodium nitrate can bring about sensitivity to impact, especially if the gel is somewhat dry.

The percentages given can be varied somewhat as regards the amount of silicon dioxide added in order to adjust consistency and effectiveness. Furthermore the addition of filler and oxygen containing substance can be varied.

EXAMPLE 4

In order to increase the incendiary effect of the combustion causing materials the following additive, which is preferably added separately in small plastic bags, more particularly to the gel, is suitable. The additive itself does not react with water and is not an incendiary material.

When it has been ignited by fire or burning fuel, more particularly gel, the additive burns very readily at temperatures between 2,000° and 2,800° C.

The composition of the additive can be varied to a certain extent in accordance with the degree of efficiency required and as regards the temperature and ignitability, as can be seen from the following table.

| | |
|---|---|
| $MnO_2$ | 50 parts by weight or 45 parts by weight |
| MnO | 10 parts by weight or 15 parts by weight |
| dark pyrogenic aluminum | 15 parts by weight or 20 parts by weight |
| sodium nitrate | 25 parts by weight or 20 parts by weight |

The maximum effectiveness is obtained from the product including this composition when it is used in a compact form and not mixed with other materials.

A standard variation, which ignites itself on a damp surface and therefore causes escaped oil to burn, so that it is a true incendiary material in accordance with the invention, has the following composition:

| | |
|---|---|
| NaNO$_3$/KNO$_3$ | 40 parts by weight (separately or as a mixture) |
| dark pyrogenic aluminum | 20 parts by weight |
| "P" substance | 40 parts by weight |

The 40 parts by weight of the "P" substance can be replaced by the mixture of 4 parts by weight of calcium carbide with a particle size of 0.2 to 2 mm and 1 part by weight of sodium metal (finely granulated) in a quantity corresponding to 40 parts by weight of the above composition.

In order to destroy by fire materials which do not burn readily the use of an incendiary material is to be recommended which contains the additive mentioned above which contains manganese dioxide, manganese oxide, pyrogenic aluminum and sodium nitrate. This is because the large amount of chemically combined oxygen contained therein provides a starting fire which cannot be extinguished and burns at a very high temperature.

The above fortifying additives should be passivated as regards the action of water if they contain substances soluble in water. Such passivation can be carried out more particularly by using highly viscous hydrocarbons during manufacture. The above-mentioned compositions can be impregnated conveniently with 5 to 10 percent Vaseline. In order to facilitate impregnation, it is possible to use, if required, a volatile hydrocarbon fraction such as petroleum ether. This treatment makes the material hydrophobic. This composition can make the incendiary or combustion-causing material of the invention sensitive to impact in addition to making it unaffected by water.

EXAMPLE 5

For the production of an incendiary material in powder form the following were mixed in a ball mill with a capacity of 20 liters at a speed of rotation of 38 rpm containing 10 large, 10 medium and 14 small balls: 80 parts by weight calcium carbide (0.2 to 2 mm) 17 parts by weight of metallic sodium (finely divided) and 3 parts by weight of heating oil The product was in a granulated form and could be used directly. It ignited well.

The quantities of carbide and igniter are not particularly critical and depend upon the activity of the igniter. They can be adjusted in amount by testing.

Generally the quantity of an igniter lies between 10 and 30 percent by weight of the carbide, the preferred range being 15 to 25 percent by weight.

The amount of igniter can be up to 20 percent of the total incendiary material, preferably 3 to 10 percent. The latter range is more particularly preferred when the incendiary material contains more than 50 percent of substances other than igniter and carbide.

The quantity of gel addition (for example hydrocarbon together with silicic acid or palmitate) can be less than the quantity of carbide plus igniter and is normally at least equal to 4 times the latter amount; preferably the carbide and igniter make up one-third to one-quarter of the amount of incendiary jelly material.

The additives of fortifying materials so as to increase the incendiary effect are normally added in an amount equal to between 0.5 to 2 parts per part of the basic material or incendiary jelly.

What is claimed is:

1. A composition for causing combustion comprising a carbide gas former selected from the group consisting of calcium carbide, aluminum carbide and magnesium carbide and an igniter selected from the group consisting of alkali metals, barium, strontium, calcium, a hydride of said metals, an oxide of said metals, an alkali metal alloy, an alkaline earth metal alloy, an alkali-alkaline earth metal alloy and an alkali-lead alloy whereby when said composition contacts water an inflammable gas is formed and ignited.

2. A composition in accordance with claim 1 in which the igniter is sodium or potassium.

3. A composition in accordance with claim 1 containing in addition a substance selected from the group consisting of alkali oxide, alkali peroxide, alkali nitrate, alkaline earth oxide, alkaline earth peroxide, alkaline earth nitrate, manganese oxides, manganese peroxide, and manganese nitrate.

4. A composition in accordance with claim 1 containing additionally a substance selected from the group consisting of: an amide of an alkali metal and an amide of an alkaline earth metal.

5. A composition in accordance with claim 1 additionally containing aluminum powder.

6. A composition in accordance with claim 1 which is in granulated form.

7. A composition in accordance with claim 1 comprising an additive selected from the group consisting of: a highly dispersed dioxide gel, a mineral capable of swelling, a thioxotropic agent, and a metal soap in a hydrocarbon.

8. A composition in accordance with claim 7 comprising a thioxotropic agent selected from the group consisting of silica, bentonite, and hectorite.

9. A composition in accordance with claim 1 wherein the alkali metal is sodium and the carbide is calcium carbide.

10. A composition in accordance with claim 9 which is in the form of a jelly-like material further containing a liquid hydrocarbon, highly dispersed silicic acid and an inflammable synthetic resin.

11. A composition in accordance with claim 9 which is in the form of a jelly-like material containing a liquid hydrocarbon, bentonite and an inflammable synthetic resin.

12. A composition in accordance with claim 9 which is in the form of a jelly-like material further containing a liquid hydrocarbon, a metal soap and an inflammable synthetic resin.

13. A composition in accordance with claim 12 in which the metal soap is sodium palmitate.

14. A composition in accordance with claim 10 in which the liquid hydrocarbon is selected from the group consisting of gasoline and middle oil, and the composition comprises silicon dioxide, crystalline polystyrene, sodium and calcium carbide.

15. A composition in accordance with claim 1 wherein said igniter is made up of finely divided particles applied onto carbide particles.

16. A composition in accordance with claim 7 in which at least one additive is passivated.

* * * * *